United States Patent
Miyata

[11] Patent Number: 5,878,855
[45] Date of Patent: Mar. 9, 1999

[54] ONE-WAY CLUTCH

[75] Inventor: Hirofumi Miyata, Kobe, Japan

[73] Assignee: Bando Chemical Industries, Ltd., Japan

[21] Appl. No.: 841,403

[22] Filed: Apr. 30, 1997

[30] Foreign Application Priority Data

May 31, 1996 [JP] Japan .................................. 8-138947

[51] Int. Cl.[6] .............................. F16D 13/06; F16D 41/00
[52] U.S. Cl. ......................................... 192/41 R; 192/80
[58] Field of Search .................................. 192/41 R, 80; 474/47, 49

[56] References Cited

U.S. PATENT DOCUMENTS

| 157,660 | 12/1874 | Weston | 192/80 X |
| 157,662 | 12/1874 | Weston | 192/80 X |
| 484,308 | 10/1892 | Fitzgerald | 192/80 |

*Primary Examiner*—Rodney H. Bonck
*Attorney, Agent, or Firm*—Sixbey, Friedman, Leedom & Ferguson, P.C.; Gerald J. Ferguson, Jr.; Tim L. Brackett, Jr.

[57] ABSTRACT

A one-way clutch is composed of a flat pulley having a circular friction surface provided on the outer circumferential surface of the flat pulley to extend circumferentially along the friction surface, a V-grooved pulley combined with the flat pulley to be rotatable relative thereto around the centerline of the friction surface and having an arc-shaped friction surface provided on the outer circumferential surface of the V-grooved pulley radially outwardly of the friction surface to extend circumferentially, an endless flat belt wound between the friction surfaces of the flat pulley and of the V-grooved pulley, and a plate spring for applying initial tension to one span of the flat belt between the pulleys. The one-way clutch has a simple structure obtainable at low cost, need not operate with high precision, and suffers a reduced number of failures resulting from excessively large input torque. In the event of failure, it is sufficient to replace the failed component. Moreover, the maximum transmissible torque can be varied.

4 Claims, 9 Drawing Sheets

LOCKING DIRECTION

FREEING DIRECTION

ONE-WAY CLUTCH

BACKGROUND OF THE INVENTION

The present invention relates to a one-way clutch including a pair of input/output members coaxially combined with each other for transmitting torque in a specified direction inputted to one of the input/output members to the other and not transmitting torque in the opposite direction inputted to one of the input/output members to the other. More particularly, it relates to the development of a low-cost one-way clutch of simple structure which need not operate with high precision.

Figure 9:
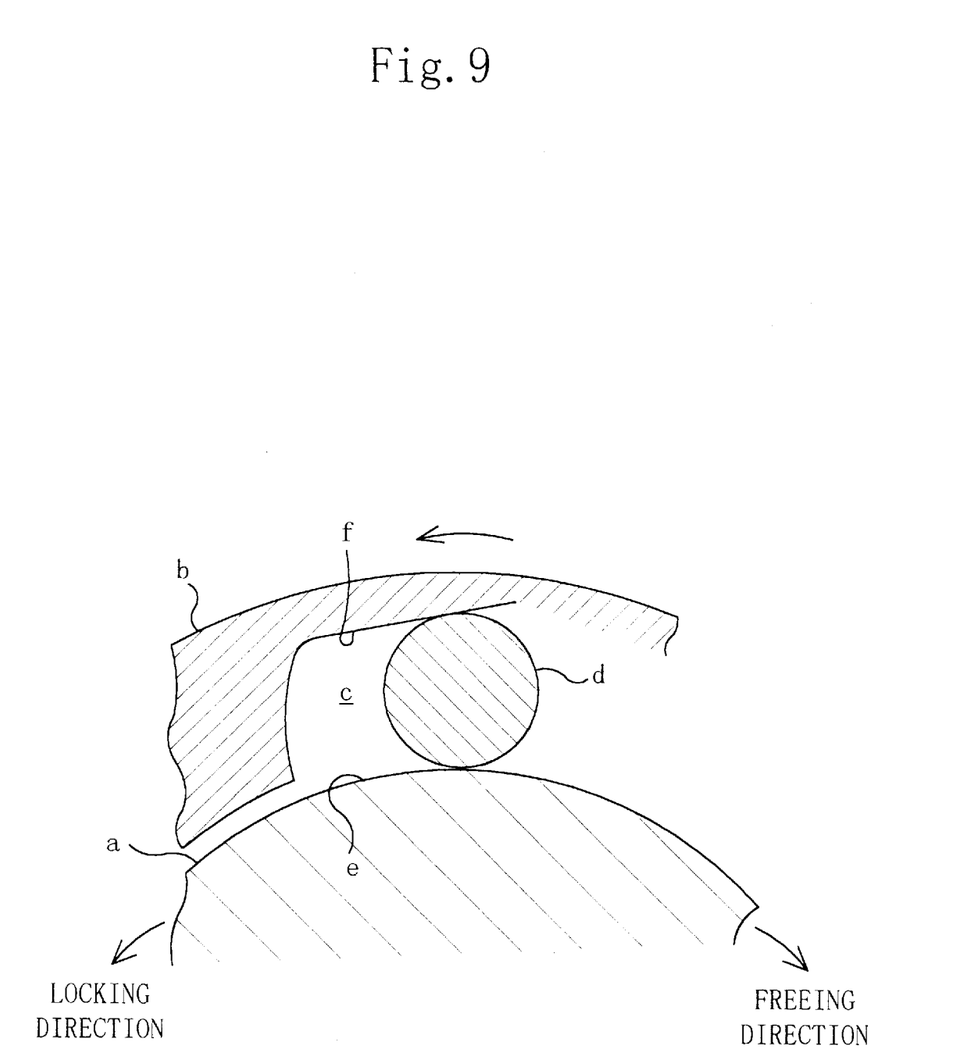
FIG. 9 is a transverse cross-sectional view showing a principal portion of a roller one-way clutch as a conventional one-way clutch.

As typical one-way clutches for use in automobiles, agricultural machinery, OA equipment, and the like, there have been known a sprag one-way clutch using a top in the form of a cocoon and a roller one-way clutch. By way of example, a description will be given to a roller one-way clutch as a conventional one-way clutch. As shown in FIG. 9, the roller one-way clutch comprises: an inner race a; and an outer race b combined with the inner race a so that it can rotate relative thereto; a plurality of recessed portions c (only one recessed portion is shown) formed circumferentially in the inner surface of the outer race b with given regular pitches; rollers d positioned in the respective recessed portions c; and springs (not shown) for biasing the individual rollers d disposed in the corresponding recessed portion c in such a direction (counterclockwise) that the roller is pushed into the space between the outer surface e of the inner race a and the inner surface f of the outer race b.

When torque in the direction (clockwise) opposite to the biasing direction of the spring is inputted to the inner race a, the rollers d are not caught in the spaces between the inner and outer races a and b so that the inner race a rotates freely from the outer race b. Consequently, the torque inputted to the inner race a is not transmitted to the outer race b and hence the outer race b does not rotate. When torque in the same direction (counterclockwise) as the biasing direction is inputted, the rollers d are caught in the spaces between the inner race a and the outer race b to exert a wedging action whereby the inner and outer races a and b are locked. Consequently, the torque inputted to the inner race a is transmitted to the outer race b so that the outer race b rotates in the same direction as the inner race a.

However, it is difficult to implement the conventional one-way clutch at low cost since it requires high-precision components and has a complicated structure.

When the torque inputted to the inner race a is excessively large over the maximum torque that can be transmitted by the clutch, the clutch will be broken. In case of breakage, replacement of the broken components is not sufficient and the whole one-way clutch should be replaced by a new one. To avoid the situation, it is necessary to preliminarily provide the one-way clutch with an additional torque limiter, which further increases cost.

Since the maximum transmissible torque cannot be changed in the conventional one-way clutch, the excessively large torque inputted to the inner race a is outputted as it is from the outer race b provided that the torque is smaller than the maximum transmissible torque. In this case also, the torque limiter is required to prevent the situation.

The present invention has been achieved in view of the foregoing circumstances. It is therefore an object of the present invention to provide a low-cost one-way clutch of simple structure utilizing belt transmission mechanism between two axes. The one-way clutch need not operate with high precision and suffers only a reduced number of failures resulting from excessively large input torque. In the event of failure, it is sufficient to replace only the failed component of the one-way clutch. Moreover, the maximum transmissible torque can be varied in the one-way clutch.

SUMMARY OF THE INVENTION

To accomplish the above object, the present inventors have utilized the following principle of operation of a belt transmission mechanism of comparatively simple structure composed of a transmission belt wound between input/output shafts. When initial tension has been applied to the slack-side span of the transmission belt, the input shaft exerts sufficient gripping force on the belt, which in turn exerts sufficient gripping force on the output shaft, resulting in torque transmission between the individual shafts. On the other hand, when initial tension has not been applied, slippage occurs due to insufficient gripping force between the belt and at least one of the shafts, so that torque transmission is not performed between the individual shafts. The present inventors have implemented the function of a one-way clutch by applying initial tension to a span of the transmission belt which becomes the slack-side span when torque in the direction of rotation to be transmitted is inputted. In a first one-way clutch according to the present invention, torque transmission is connected and disconnected between the input and output shafts in accordance with variations in two gripping forces between the belt and the individual shafts. In a second one-way clutch according to the present invention, torque transmission is connected and disconnected between the input and output shafts in accordance with a variation in one gripping force between the belt and one of the shafts.

Specifically, the first one-way clutch according to the present invention comprises: a first input/output member having a circular friction surface provided on an outer circumferential surface of the first input/output member to extend circumferentially; a second input/output member combined with the first input/output member to be rotatable relative thereto around a centerline of the circular friction surface of the first input/output member, the second input/output member having an arc-shaped friction surface provided on an outer circumferential surface of the second input/output member radially outwardly of the circular friction surface of the first input/output member to extend circumferentially along the circular friction surface; an endless friction member wound between the friction surfaces of the first and second input/output members; and tension applying means for applying initial tension to one of the spans of the friction member between the first and second input/output members.

In the arrangement, since the initial tension has been applied by the tension applying means to the friction member, sufficient gripping forces are obtained between the friction member and the respective friction surfaces of the first and second input/output members. When torque is inputted to the first input/output member, for example, the friction member runs in the same direction as the direction of rotation of the first input/output member to transmit the torque to the second input/output member. Consequently, the span going into the first input/output member becomes the tight-side span, while the span coming out of the first input/output member becomes the slack-side span.

When the span (one of the spans) having received the initial tension from the tension applying means becomes the tight-side span, the gripping forces between the friction member and the individual friction surfaces are lowered since the slack-side span on the opposite side (the other span) has not received the initial tension, resulting in slips therebetween. Hence, the torque inputted to the first input/output member is not transmitted to the friction member and to the second input/output member so that only the first input/output member rotates and the second input/output member does not rotate. As a result, the one-way clutch is brought into the free state.

On the other hand, when the span (one of the spans) having received the initial tension becomes the slack-side span, the gripping forces are maintained between the friction member and the individual friction surfaces because of the initial tension applied to the slack-side span. Hence, the torque inputted to the first input/output member is transmitted to the second input/output member via the friction member so that the second input/output member rotates in the same direction as the first input/output member rotates. As a result, the one-way clutch is brought into the locked state.

When the torque inputted to the first input/output member is further increased with the initial tension applied to the slack-side span, the probability of slips occurring between the friction member and the individual friction surfaces increases accordingly. When the torque reaches a specified value, transition is made to the state where the probability of slips drastically increases to 100%. Consequently, only torque that is roughly constant is transmitted to the friction member and to the second input/output member. In short, the one-way clutch functions as a torque limiter with respect to excessively large torque. Since the specified value varies depending on the initial tension applied by the tension applying means to the slack-side span, the maximum torque that can be transmitted by the one-way clutch is controlled arbitrarily through the setting of the initial tension.

In the case where torque is inputted to the second input/output member, the same action as implemented in the foregoing case is implemented except that the functions of the first and second input/output members are switched.

Thus, in the arrangement, the function of a one-way clutch is implemented by the simple structure which need not operate with high precision. What results is a one-way clutch lower in cost than a conventional one-way clutch such as the roller one-way clutch. The resulting one-way clutch suffers a reduced number of failures resulting from excessively large input torque over the maximum transmissible torque. In the event of failure of the friction member for example, it can easily be replaced by a new one, so that the one-way clutch is also excellent in terms of maintenance. Moreover, the maximum transmissible torque can be controlled by varying the setting of the initial tension to be applied to the span, which enables proper control of the excessively large input torque.

In the above arrangement, the second input/output member has a movable element rotatably pivoted around an axis which is parallel to an axis of the second input/output member and displaced toward the other span of the friction member in a main body of the second input/output member, the movable element having the arc-shaped friction surface of the second input/output member provided thereon, and the tension applying means is composed of biasing means for rotatably biasing the movable element in such a direction as to apply the initial tension to one of the spans of the friction member with the arc-shaped friction surface pressing the friction member radially outwardly.

In this case, the initial tension has been applied to one of the spans of the friction member by the biasing means rotatably biasing the movable element rotatably pivoted around the axis thereof which is parallel to the axis of the second input/output member and displaced toward the other span of the friction member in the main body of the second input/output member. In the case where torque is inputted to the first input/output member, the span of the friction member going into the first input/output member becomes the tight-side span, while the span coming out of the first input/output member becomes the slack-side span, similarly to the first one-way clutch.

When the first input/output member rotates in such a direction as to change the span having received the initial tension (one of the spans) into the slack-side span, gripping forces are maintained between the friction member and the respective friction surfaces, so that the torque inputted to the first input/output member is transmitted to the friction member and to the second input/output member via the friction member. As a result, the one-way clutch is brought into the locked state. In the locked state, the span which has not received the initial tension (the other span) becomes the tight-side span and increased tension in the tight-side span rotates the movable element of the second input/output member in the biasing direction of the biasing means so that the friction surface presses the friction member. Consequently, tension exceeding the initial tension is applied to the slack-side span, which satisfactorily increases gripping forces between the friction member and the individual friction surfaces and prevents slips. Accordingly, more positive transmission of torque is performed between the first and second input/output members, while the maximum transmissible torque is increased.

On the other hand, when the first input/output member rotates in such a direction as to change the span (one of the spans) which has received the initial tension into the tight-side span, the slack-side span (the other span) on the opposite side has not received the initial tension and a friction member does not produce in the movable element a rotary force in such a direction that the friction surface presses the friction member, so that the tension in the slack-side span is not increased and maintained at a low level. As a result, slips occur between the friction member and the individual friction surfaces, which brings the one-way clutch into the free state.

Thus, in the above arrangement, when the other span of the friction member becomes the tight-side span and the tension therein is increased in the arrangement, tension larger than the initial tension can be applied to the slack-side span so that more positive transmission of torque is performed between the first and second input/output members, while the maximum transmissible torque is increased.

Furthermore, in the above arrangement, the main body of the second input/output member is provided with a stopper for restricting the rotation of the movable element in the biasing direction on contact with the movable element rotatably biased by the biasing means.

In the arrangement, when the other span of the friction member becomes the tight-side span and the increased tension therein rotates the movable element in the biasing direction of the biasing means to increase the maximum transmissible torque, the movable element has its rotation in the biasing direction restricted on contact with the stopper of the main body. This suppresses the increase in maximum transmissible torque so that problems resulting from the ever-increasing maximum transmissible torque, such as early deterioration of the friction member under overload, is prevented.

The second one-way clutch according to the present invention comprises: a first input/output member having a circular friction surface provided on an outer circumferential surface of the first input/output member to extend circumferentially; a second input/output member combined with the first input/output member to be rotatable relative thereto around a centerline of the circular friction surface of the first input/output member; a friction member wound between the circular friction surface of the first input/output member with both ends fastened to the second input/output means; and tension applying means for applying initial tension to one of the spans of the friction member between the first and second input/output members.

In the arrangement, the friction member has both ends fastened to the second input/output member, which is different from the above first one-way clutch. Accordingly, the friction member rotates in unison with the second input/output member. As a result, torque transmission between the friction surface and the first input/output member, i.e., torque transmission between the first and second input/output members is connected and disconnected in accordance with variations in gripping forces between the friction member and the first input/output member. As for the other actions, they are substantially the same as the actions of the first one-way clutch.

DETAILED DESCRIPTION OF THE INVENTION

Referring to the drawings, the individual embodiments of the present invention will be described.
(First Embodiment)

Figure 1:
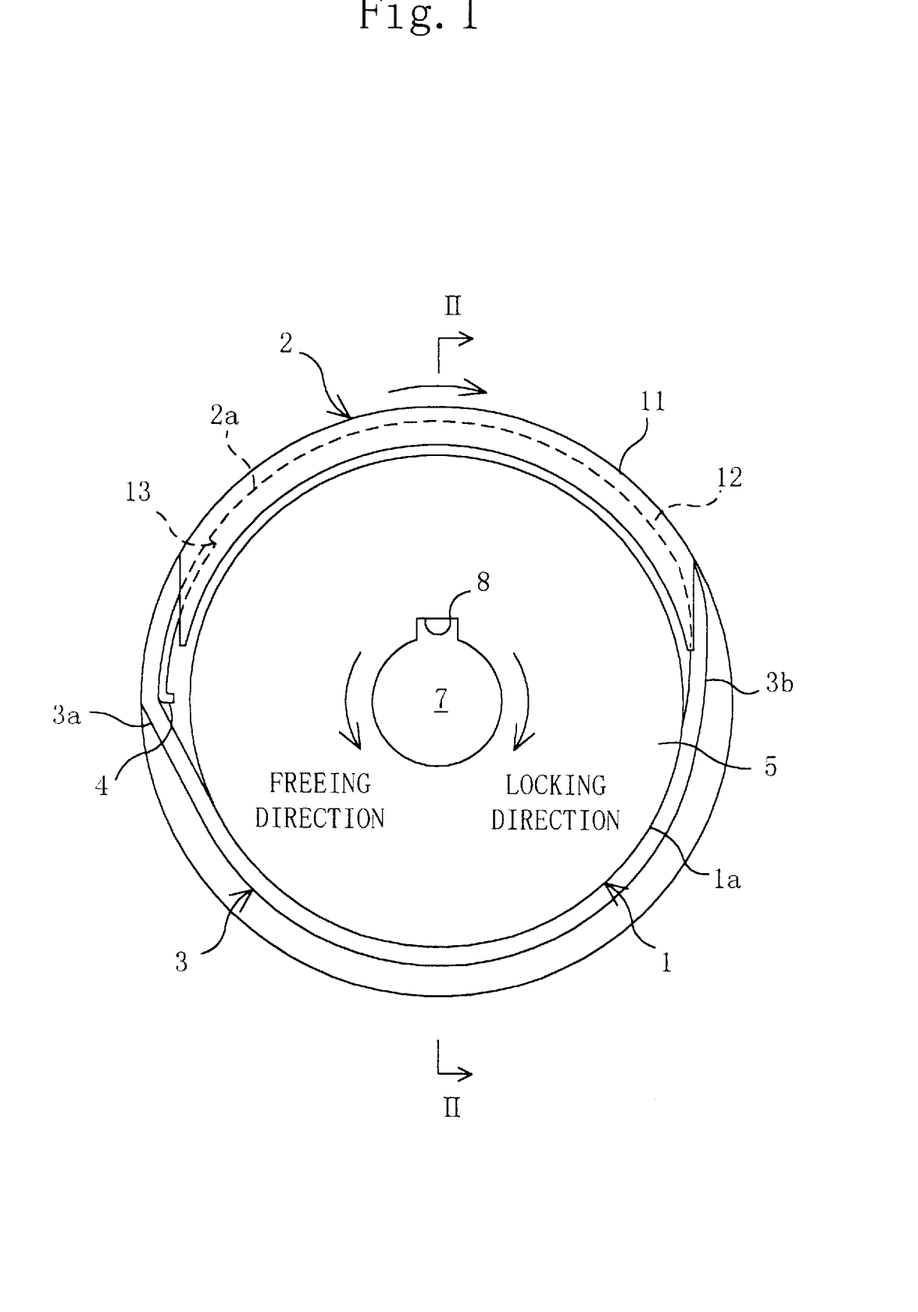
FIG. 1 is a front view of a one-way clutch according to a first embodiment of the present invention.
Figure 2:
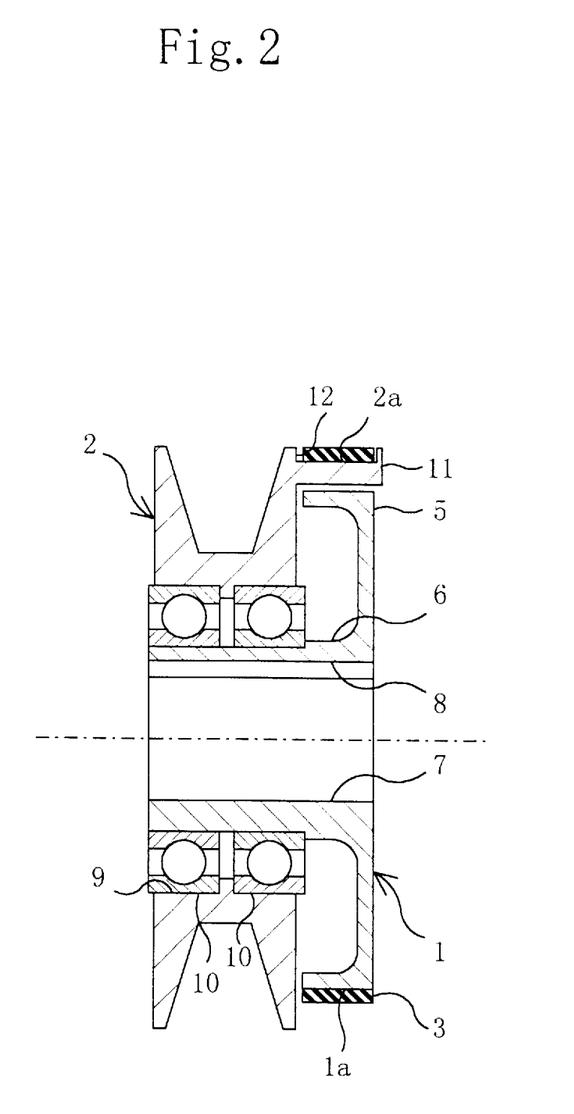
FIG. 2 is a cross-sectional view taken along the line II—II of FIG. 1.

FIGS. 1 and 2 show a belt one-way clutch according to a first embodiment of the present invention.

The belt one-way clutch comprises: a flat pulley 1 as a first input/output member having a circular friction surface 1a provided on the outer circumferential surface of the flat pulley 1 to extend circumferentially; a V-grooved pulley 2 as a second input/output member combined with the first flat pulley 1 so that it can rotate relative thereto around the centerline (the axis of the flat pulley 1 indicated by the dash-dot line in FIG. 2) and having an arc-shaped friction surface 2a provided on the outer circumferential surface of the V-grooved pulley 2 radially outwardly of the friction surface 1a of the flat pulley 1 to extend circumferentially along the friction surface 1a; a flat belt 3 as an endless friction member wound between the friction surfaces 1a and 2a of the pulleys 1 and 2; and a rectangular plate spring 4 as tension applying means for applying initial tension to one span 3a (on the left side of FIG. 1) of the flat belt 3 between the pulleys 1 and 2. In the present embodiment, an input shaft is connected to the flat pulley 1 so that it can rotate in unison therewith and a V-belt for outputting is entrained around the V-grooved pulley 2, though the drawing thereof is omitted.

The flat pulley 1 is composed of a flat pulley portion 5 in the form of a bottomed cylinder and a boss portion 6 extending from the center of the bottom portion of the flat pulley portion 5 along the axis of the flat pulley portion 5. The outer circumferential surface of the flat pulley portion 5 forms the friction surface 1a. Around the axis of the boss portion 6, there is formed a shaft hole 7 through which the input shaft is inserted and fixed. In FIGS. 1 and 2 is also shown a key seat 8 for connecting the input shaft to the flat pulley 1.

The V-grooved pulley 2 has a shaft hole 9 with a diameter larger than the outer diameter of the boss portion 6 of the flat pulley 1. With the boss portion 6 concentrically inserted through the shaft hole 9, two bearings 10 are arranged in the axial direction. The construction described thus far allows the V-grooved pulley 2 to rotate relative to the flat pulley 1.

The V-grooved pulley 2 is designed to have an outer diameter larger than the outer diameter of the flat pulley portion 5. In the vicinity of the peripheral edge of one end face (on the right side of FIG. 2) of the V-grooved pulley 2, there is provided a projecting wall 11 having an arc-shaped cross section which projects in the axial direction and extends circumferentially along the friction surface 1a of the flat pulley portion 5. The outer peripheral portion of the entire projecting wall 11 is formed with a belt groove 12 having a U-shaped cross section opened radially outwardly and extending circumferentially. The bottom surface of the belt groove 12 forms the friction surface 2a.

The portion of the friction surface 2a corresponding to one circumferential end (on the left side of FIG. 1) of the belt groove 12 is provided with a recessed portion 13 for fixture which receives the base end portion of the plate spring 4 so that the outer surface of the plate spring 4 is flush with the friction surface 2a. The plate 4 is fixed by means of a rivet or the like with its base end portion buried in the recessed portion 13 for fixture. The tip portion of the plate spring 4 protruding tangentially from one end of the belt groove 12 is bent with small curvature toward the axis. The plate spring 4 is so designed as to apply initial tension to the span 3a of the flat belt 3 by slidably pressing the inner surface of the span 3a radially outwardly.

The portion of the friction surface 2a corresponding to the other circumferential end of the belt groove 12 is so configured as to have a radius of curvature gradually decreasing toward the end portion thereof. The configuration allows smooth running of the flat belt 3 between the other circumferential end of the friction surface 2a of the V-grooved pulley 2 and the friction surface 1a of the flat pulley 1.

The flat belt 3 is a friction belt composed of the main body of the belt made of rubber or like material which is rectangular in cross section and a cord buried in the main body of the belt with given regular pitches, while extending substantially lengthwise of the belt. As necessary, the inner surface or outer surface of the main body of the belt has a canvas layer integrally stacked thereon.

Figure 3:
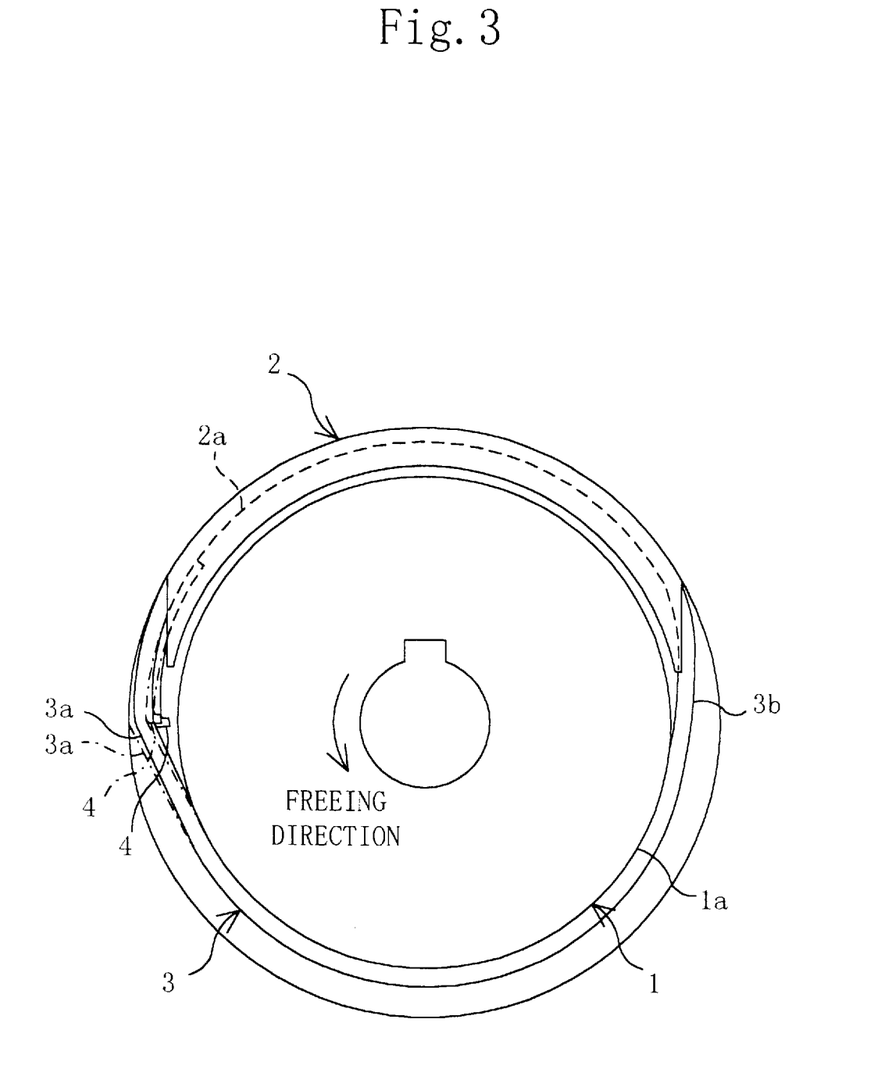
FIG. 3 is a front view of the one-way clutch in a free state, which is exaggerated for the purpose of illustration.

A description will be given to the operation of the one-way clutch thus constituted with reference to FIGS. 3 and 4.

First, the plate spring 4 applies initial tension to the flat belt 3 so that gripping forces are produced between the flat belt 3 and the friction surface 1a of the flat pulley 1 and between the flat belt 3 and the friction surface 2a of the V-grooved pulley 2. With the flat belt 3 under initial tension, when a counterclockwise torque is inputted to the flat pulley 1 as shown in FIG. 3, the flat belt 3 runs in the same direction as the direction of rotation of the flat pulley 1 to transmit the torque to the V-grooved pulley 2, so that the span 3a going into the flat pulley 1 which is initially at rest indicated by the dash-dot line becomes the tight-side span as exaggeratedly indicated by the solid line. On the other hand, the span 3b coming out of the flat pulley 1 becomes the slack-side span.

Since the slack-side span 3a of the flat belt 3 has not received initial tension, each of the gripping forces between the flat belt 3 and the individual friction surfaces 1a and 2a is reduced, resulting in slips occurring between the flat belt 3 and the individual friction surfaces 1a and 2a. Hence, the torque inputted to the flat pulley 1 is not transmitted to the flat belt 3 or V-grooved pulley 2, only causing the flat pulley 1 to rotate and not causing the V-grooved pulley 2 to rotate. As a result, the one-way clutch is brought into a free state.

Figure 4:
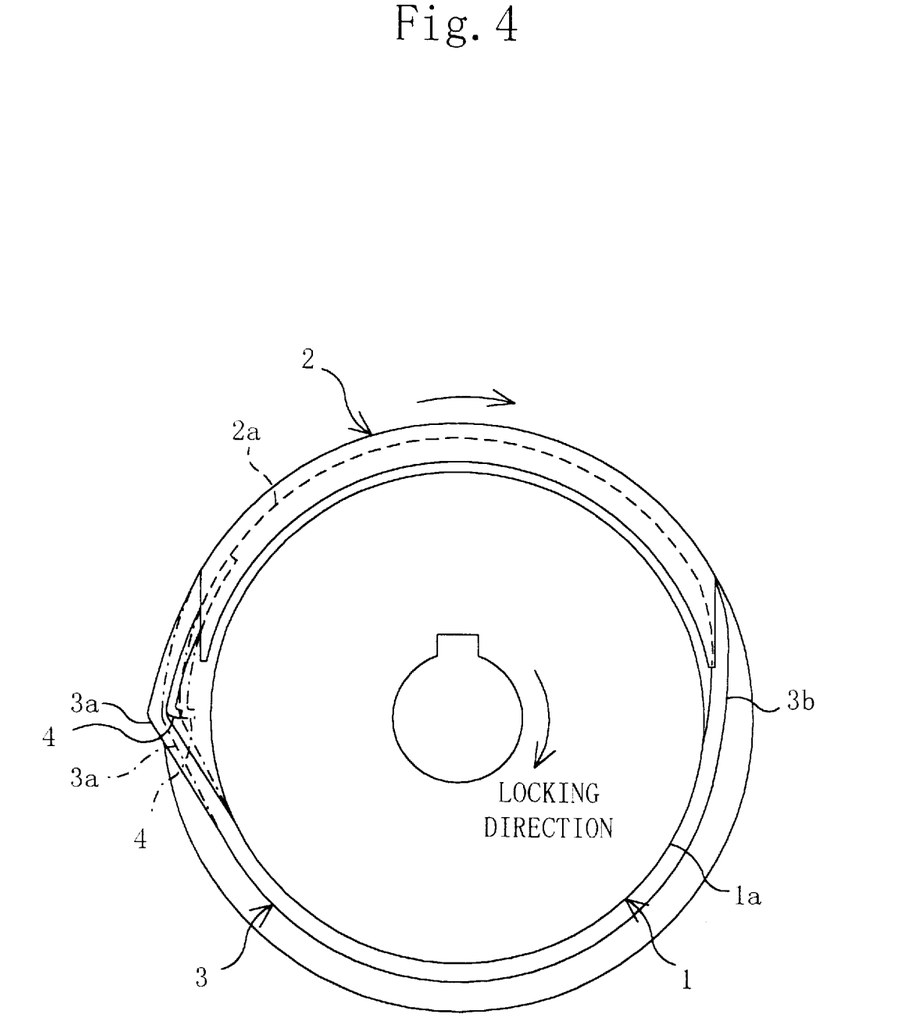
FIG. 4 is a front view of the one-way clutch in a locked state, which is exaggerated for the purpose of illustration.

On the other hand, when a clockwise torque is inputted to the flat pulley 1 as shown in FIG. 4, the span 3a which has been the tight-side span in the foregoing case is initially at rest indicated by the dash-dot line and changed from the tight-side span to the slack-side span as exaggeratedly indicated by the solid line, while the span 3b which has been the slack-side span in the foregoing case is changed from the slack-side span to the tight-side span. Since initial tension has been applied by the plate spring 4 to the slack-side span 3a, the gripping forces are maintained between the flat belt 3 and the individual friction surfaces 1a and 2a. Hence, the torque inputted to the flat pulley 1 is transmitted to the flat belt 3 and to the V-grooved pulley 2 via the flat belt 3, so that the V-grooved pulley 2 rotates in the same direction as the flat pulley 1 rotates. As a result, the one-way clutch is brought into a locked state.

A supplemental description will be given to the relationship between the position of the plate spring 4 and the freeing/locking directions of the one-way clutch. The plate spring 4 is satisfactorily placed in such a position as to apply initial tension to the span 3a of the flat belt 3 which becomes the slack-side span when the torque in the direction to be transmitted is inputted to the flat pulley 1 as the input member. In other words, it is sufficient for the plate spring 4 to apply initial tension to the span downstream of the input member when the torque in the direction to be transmitted is inputted (the span 3a on the left side of FIG. 1 illustrating the first embodiment).

When the clockwise torque inputted to the flat pulley 1 as shown in FIG. 4 increases further, the probability of slips occurring between the flat belt 3 and the individual friction surfaces 1a and 2a is increased. When the increasing torque reaches a specified value, the probability of slips is drastically increased to 100%, so that only torque which is substantially constant is transmitted to the flat belt 3 and to the V-grooved pulley 2. In short, the one-way clutch functions as a torque limiter with respect to excessively large torque. Since the specified value varies depending on the initial tension applied by the plate spring 4 to the slack-side span 3a of the flat belt 3, the maximum torque that can be transmitted by the one-way clutch is controlled arbitrarily through the setting of the initial tension.

Thus, according to the present embodiment, the simple structure composed of the flat pulley 1, the V-grooved pulley 2, the flat belt 3, and the plate spring 4 performs the function of a one-way clutch without operating with high precision. What results is a one-way clutch lower in cost than the sprag one-way clutch as the conventional one-way clutch.

When excessively large torque over the maximum transmissible torque is inputted, slips occur between the flat belt 3 and the individual friction surfaces 1a and 2a and prevent the torque from being transmitted as it is to the flat belt 3 and to the V-grooved pulley 2. Consequently, there can be prevented failures resulting from the excessively large input torque without using an additional torque limiter. In case of aging or failure of the flat belt 3, it can be replaced easily by a new one, so that the one-way clutch is also excellent in terms of maintenance.

Moreover, since the maximum transmissible torque can be controlled by varying the setting of the initial tension to be applied by the plate spring 4 to the slack-side span 3a of the flat belt 3, the excessively large input torque can be controlled properly without using an additional torque limiter.

Although the first embodiment has described the case where the torque is inputted to the flat pulley 1, when the torque is inputted to the V-grooved pulley 2, transmission of the torque can be connected and disconnected depending on the direction of rotation of the V-grooved pulley 2. For example, when the V-grooved pulley 2 rotates clockwise in the first embodiment illustrated by FIG. 1, the one-way clutch is brought into the free state. When the V-grooved pulley 2 rotates counterclockwise, the one-way clutch is brought into the locked state.

Although the flat pulley 1 and the V-grooved pulley 2 are used as the first and second input/output members in the first embodiment, gears, chain sprockets, or shafts may be used instead.

Although the flat belt 3 made of rubber is used as the friction member in the first embodiment, the material and configuration of the flat belt 3 are not particularly limited. For example, a metal hoop may be used instead as the friction member.

Although the inner surface of the span 3a is pressed by means of the plate spring 4 in the first embodiment, the outer surface of the span 3a may be pressed instead.

Although the initial tension is applied to the span 3a by pressing the span 3a in the first embodiment, the tension applying means may be constituted by means other than the pressing means provided that the initial tension is applied.

(Second Embodiment)

Figure 5:
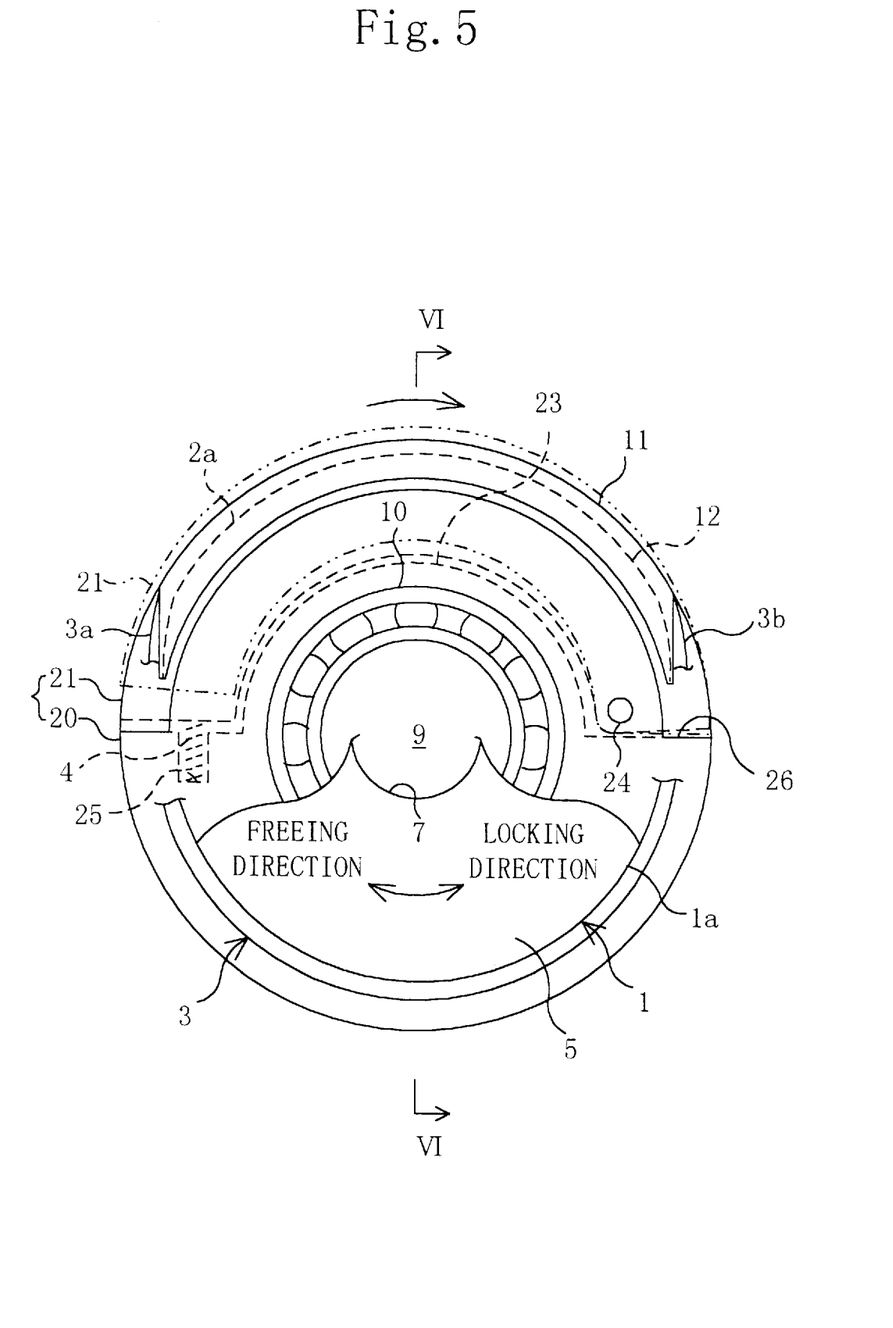
FIG. 5 is a partial cut-away view of a one-way clutch according to a second embodiment of the present invention, which corresponds to FIG. 1.
Figure 6:
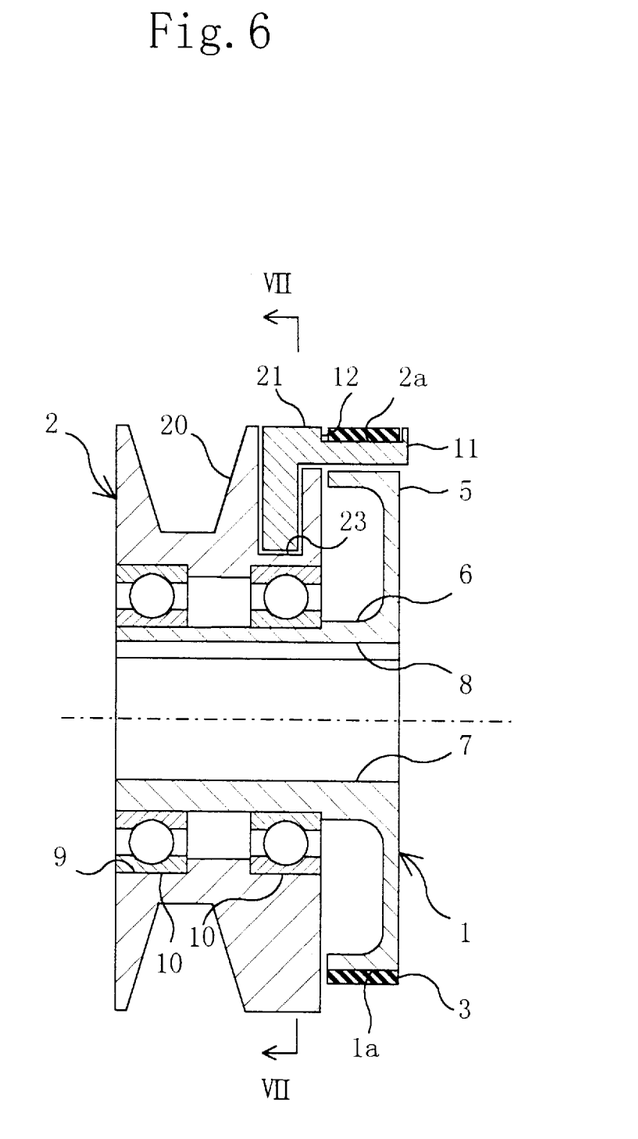
FIG. 6 is a cross-sectional view taken along the line VI—VI of FIG. 5.
Figure 7:
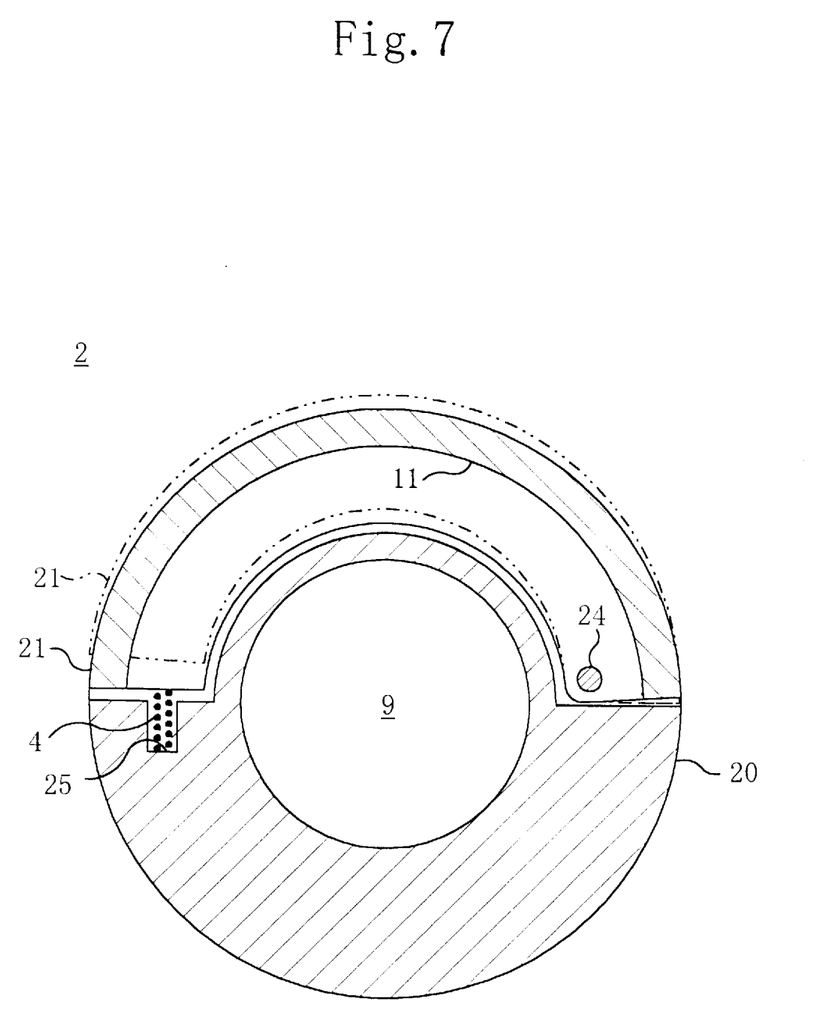
FIG. 7 is a cross-sectional view taken along the line VII—VII of FIG. 6.

FIGS. 5 to 7 show a belt one-way clutch according to a second embodiment of the present invention. In the second embodiment, like reference numerals designate like components used in the first embodiment.

The pulley 2 according to the second embodiment has a movable element 21 rotatably pivoted around an axis which is parallel to the center axis of the V-grooved pulley 2 and displaced toward the other span 3b of the flat belt 3 in the main body 20 of the V-grooved pulley 2. The movable element 21 is also formed with the friction surface 2a of the V-grooved pulley 2. In a position closer to the span 3a of the flat belt 3 between the main body 20 and the movable element 21, there is provided a compressed coil spring 4 as biasing means for rotatably biasing the movable element 2 in the direction in which initial tension is applied to the span 3a of the flat belt 3 with the friction surface 2a pressing the flat belt 3 radially outwardly.

The portion of the main body 20 of the V-grooved pulley 2 located on one end thereof (on the right side of FIG. 6) is designed to be larger in size in the axial direction than in the first embodiment with the provision of an accommodation groove 23 having a U-shaped cross section opened radially outwardly. The accommodation groove 23 extends circumferentially halfway around the main body 20 so that the movable element 21 is disposed therein. As shown in FIG. 7, the movable element 21 is in the form of a quasi-semicircular arc with one circumferential end (on the right side of FIG. 7) rotatably pivoted by a pivoting pin 24. The wall face of the accommodation groove 23 in the main body 20 located on the side of the span 3a of the flat belt 3 is formed with a spring hole 25 opened to the accommodation groove 23, in which the compressed coil spring 4 is disposed. With the compressed coil spring 4 rotatably biasing the movable element 21 around the pivoting pin 24 so that the fiction surface 2a presses the flat belt 3, initial tension is applied to the span 3a.

On the other hand, the wall face of the accommodation groove 23 in the main body 20 located on the side of the span 3b of the flat belt 3 is designed to serve as a stopper 26 for restricting the rotation of the movable element 21 in the basing direction on contact with the movable element 21 rotatably biased by the compressed coil spring 4, as indicated by the phantom line in FIG. 7. As for the other components, the description thereof will be omitted, since they are the same as in the first embodiment.

A description will be given to the operation of the one-way clutch.

When the clockwise torque is inputted to the flat pulley 1, the span 3a having received initial tension becomes the slack-side span and hence the gripping forces are maintained between the flat belt 3 and the individual friction surfaces 1a and 2a, so that the torque inputted to the flat pulley 1 is transmitted to the flat belt 3 and to the V-grooved pulley 2 via the flat belt 3. As a result, the one-way clutch is brought into the locked state. In the locked state, the span 3b which has not received initial tension becomes the tight-side span and the increased tension in the span 3b rotates the movable element 21 of the V-grooved pulley 2 in the biasing direction of the compressed coil spring 4 relative to the main body 20, so that the friction surface 2a presses the flat belt 3 responsively. As a result, the slack-side span 3a receives tension exceeding the initial tension and gripping forces are increased accordingly between the flat belt 3 and the individual friction surfaces 1a and 2a, which satisfactorily prevents slips and ensures torque transmission between the pulleys 1 and 2, resulting in an increase in maximum transmissible torque.

When the maximum transmissible torque is increased, the movable element 21 has its rotation in the biasing direction restricted on contact with the stopper 26 of the main body 20. This suppresses the increase in maximum transmissible torque and prevents problems resulting from the ever-increasing maximum transmissible torque.

On the other hand, when the counterclockwise torque is inputted to the flat pulley 1, the span 3a which has received initial tension is changed from the slack-side span to the tight-side span. Since the slack-side span 3b on the opposite side has not received initial tension and the flat belt 3 does not produce in the movable element 21 rotary force in the direction in which the friction surface 2a presses the flat belt 3, the tension in the slack-side span 3b is not increased but maintained at a low level so that slips occur between the flat belt 3 and the individual friction surfaces 1a and 2a. As a result, the one-way clutch is brought into the free state.

Thus, according to the present embodiment, when the torque in the locking direction is inputted to the flat pulley 1 of the one-way clutch, the movable element 21 of the V-grooved pulley 2 can be rotated in the direction in which the friction surface 2a of the V pulley 2 presses the flat belt 3 by using the increased tension in the tight-side span 3b of the flat belt 3, so that tension exceeding the initial tension is applied to the slack-side span 3a. As a result, positive transmission of torque can be performed between the flat pulley 1 and the V-grooved pulley 2, while the maximum transmissible torque can be increased.

Since the stopper 26 provided in the main body 20 of the V-grooved pulley 2 can suppress the increase in maximum transmissible force induced by the rotation of the movable element 21, there can be prevented problems resulting from the ever-increasing maximum transmissible torque, such as early deterioration of the flat belt 3 under overload.

Although the compressed coil spring 4 is used as the biasing means in the second embodiment and positioned on the opposite side of the pivoting pin 24 of the movable element 21, another biasing means may be used instead and the position thereof is not particularly limited.

(Third Embodiment)

Figure 8:
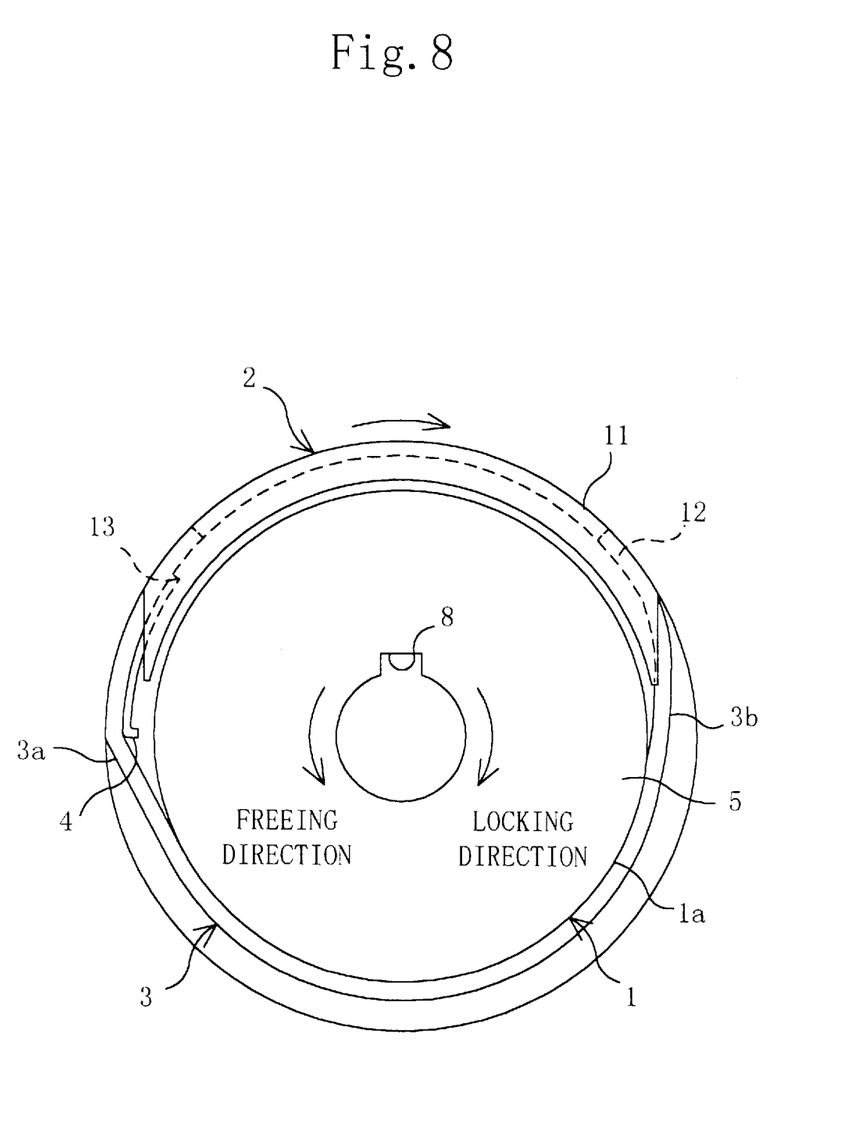
FIG. 8 is a view showing a one-way clutch according to a third embodiment of the present invention, which corresponds to FIG. 1.

FIG. 8 shows a belt one-way clutch according to a third embodiment of the present invention. In the third embodiment, like reference numerals designate like components used in the first embodiment.

In the present embodiment, the flat belt 3 with both ends is used as the friction member. The flat belt 3 is disposed in the belt groove 12 formed in the projecting wall 11 of the V-grooved pulley 2 and have both ends fastened to the respective circumferential ends of the belt groove 12. As for the other components, the description thereof will be omitted since they are the same as in the first embodiment.

Since the present embodiment implements substantially the same action as implemented by the first embodiment except that torque transmission is connected and disconnected between the pulleys 1 and 2 depending only on the gripping force produced between the flat belt 3 and the friction surface 1a of the flat pulley 1, the same effect achieved by the first embodiment can also be achieved by the present embodiment.

We claim:

1. A one-way clutch comprising:
    a first input/output member having a circular friction surface provided on an outer circumferential surface of the first input/output member to extend circumferentially;
    a second input/output member combined with said first input/output member to be rotatable relative thereto around a centerline of the circular friction surface of the first input/output member, said second input/output member having an arc-shaped friction surface provided on an outer circumferential surface of said second input/output member radially outwardly of the circular friction surface of said first input/output member to extend circumferentially along said circular friction surface;
    an endless friction member wound between the friction surfaces of the first and second input/output members to form two spans between said first and second input/output members; and
    tension applying means for applying initial tension to one of the spans of said friction member between the first and second input/output members.

2. A one-way clutch according to claim 1, wherein said second input/output member has a movable element rotatably pivoted around an axis which is parallel to an axis of said second input/output member and displaced toward the other span of the friction member in a main body of the second input/output member, said movable element having the arc-shaped friction surface of said second input/output member provided thereon, and said tension applying means is composed of biasing means for rotatably biasing said movable element in such a direction as to apply the initial tension to one of the spans of the friction member with said arc-shaped friction surface pressing the friction member radially outwardly.

3. A one-way clutch according to claim 2, wherein the main body of said second input/output member is provided with a stopper for restricting the rotation of the movable element in said biasing direction on contact with the movable element rotatably biased by the biasing means.

4. A one-way clutch comprising:

a first input/output member having a circular friction surface provided on an outer circumferential surface of the first input/output member to extend circumferentially;

a second input/output member combined with said first input/output member to be rotatable relative thereto around a centerline of the circular friction surface of the first input/output member;

a friction member wound between the circular friction surface of said first input/output member with both ends fastened to the second input/output means, to form two spans between said first and second input/output members; and tension applying means for applying initial tension to one of the spans of said friction member between said first and second input/output members whereby a grip of said friction member on said friction surface of said first input/output member varies in accordance with a rotation direction of one of said first and second input/output members relative to the other of said first and second input/output members.

* * * * *